(12) United States Patent
Tsubai

(10) Patent No.: US 7,958,850 B2
(45) Date of Patent: Jun. 14, 2011

(54) CAGE FOR BREEDING HENS AND COCKS

(75) Inventor: Yasushi Tsubai, Kakamigahara (JP)

(73) Assignee: Hytem Co., Ltd., Gifu (JP)

( * ) Notice: Subject to any disclaimer, the term of this patent is extended or adjusted under 35 U.S.C. 154(b) by 148 days.

(21) Appl. No.: 12/298,952

(22) PCT Filed: May 2, 2007

(86) PCT No.: PCT/JP2007/059392
§ 371 (c)(1),
(2), (4) Date: Oct. 29, 2008

(87) PCT Pub. No.: WO2007/129672
PCT Pub. Date: Nov. 15, 2007

(65) Prior Publication Data
US 2009/0084323 A1   Apr. 2, 2009

(30) Foreign Application Priority Data

May 2, 2006   (JP) .................................. 2006-128449

(51) Int. Cl.
*A01K 31/18* (2006.01)
(52) U.S. Cl. ...................... 119/441; 119/455; 119/472
(58) Field of Classification Search .................. 119/455, 119/456, 458, 472, 487, 437, 441
See application file for complete search history.

(56) References Cited

U.S. PATENT DOCUMENTS

| | | | | |
|---|---|---|---|---|
| 643,978 A * | 2/1900 | Ramsay | ............................ | 217/48 |
| 894,638 A * | 7/1908 | Heim | ............................ | 220/4.29 |
| 937,422 A * | 10/1909 | Collas | ............................ | 220/6 |
| 1,212,289 A * | 1/1917 | Ackeren | ............................ | 119/437 |
| 1,772,814 A * | 8/1930 | Laycock | ............................ | 220/4.01 |
| 1,802,579 A * | 4/1931 | Scott | ............................ | 209/244 |
| 2,536,621 A * | 1/1951 | Arnold | ............................ | 119/441 |
| 2,805,644 A | 9/1957 | Lieberman | | |
| 3,492,970 A | 2/1970 | Keen et al. | | |
| 3,545,406 A | 12/1970 | Osborn | | |
| 7,059,274 B2 * | 6/2006 | Cheng | ............................ | 119/455 |

FOREIGN PATENT DOCUMENTS

| | | |
|---|---|---|
| JP | 35-16682 | 7/1960 |
| JP | 59-81353 | 6/1984 |
| JP | 08-172966 | 7/1996 |

* cited by examiner

*Primary Examiner* — Rob Swiatek
*Assistant Examiner* — Kristen C Hayes
(74) *Attorney, Agent, or Firm* — Stites & Harbison PLLC; Douglas E. Jackson

(57) ABSTRACT

A cage is provided which is sanitary and efficient and can make hens who tend to gather at the four corners scatter. An oblong and rectangular cage having a floor formed to allow hens and cocks to move freely thereon. The cage includes an outer peripheral section substantially surrounding the entire floor and allowing air to freely pass through it. The cage also includes a plurality of intermediate partitions that are arranged transversally relative to the floor to divide the oblong space on the floor. The intermediate partitions have visually blockading surfaces in order to produce corners that are as relaxing to hens as the four corners.

4 Claims, 6 Drawing Sheets

CAGE FOR BREEDING HENS AND COCKS

TECHNICAL FIELD

The present invention relates to a cage for breeding hens and cocks serving for the purpose of collecting hatching eggs (eggs for hatching chicks) laid by natural mating. More particularly, the present invention relates to a cage for breeding hens and cocks serving for the purpose of improving both the quantity and the quality of collected hatching eggs.

BACKGROUND ART

Known cages for breeding hens and cocks provide only a wide space where hens and cocks can move freely as disclosed in Patent Document 1.
Patent Document 1: Jp. Pat. Appln. Laid-Open Publication No. 08-172966

DISCLOSURE OF THE INVENTION

Problems to Be Solved by the Invention

Recent experiences tell that hens lay eggs habitually mostly at the four corners of the cage if the cage is made spacious particularly in the longitudinal direction. The hatching eggs that are laid at the four corners can highly probably be contaminated by harmful bacteria produced from feces of hens who huddle together there and also collide with each other to damage themselves, reducing the probability of obtaining high quality hatching eggs. Additionally, hens who cannot take a good position at any of the four corners less probably lay hatching eggs. Thus, experiences prove that these two factors make it difficult to obtain good hatching eggs.

Therefore, the object of the present invention is to provide a novel cage for breeding hens and cocks that dissolves the above-identified problems.

Means for Solving the Problems

The above object is achieved by providing a cage for breeding hens and cocks serving for the purpose of collecting hatching eggs laid by natural mating, characterized by comprising:

an oblong and continuous floor made of a material suitable for allowing air to pass freely through it and hens and cocks being fed in the cage to freely move in all directions;

an outer peripheral section serving as outer peripheral walls surrounding the floor and also made of material suitable for allowing air to pass freely through them; and a plurality of intermediate partitions arranged transversally relative to the longitudinal direction of the floor and having visually blockading surfaces;

the intermediate partitions and the outer peripheral section producing shaded areas at the corners formed by them.

In addition, preferably such a cage is characterized in that each of the visually blockading surfaces of each of the intermediate partitions has an area greater than the visually blockading surface of each of the end partitions arranged respectively at the opposite ends of the cage.

Further, preferably such a cage is characterized in that each of the intermediate partitions is provided at an upper part of the blockading-surface-forming plate thereof with a window for freely viewing the inside of the cage.

Advantages of the Invention

The invention provides the following advantages.

In the case of known cages for breeding hens and cocks having a floor allowing hens and cocks being fed in the cage to freely move thereon in all directions and an outer peripheral section arranged substantially along all the outer periphery of the floor so as to allow air to freely pass through it, it has been found by repeated observations that hatching eggs are laid mostly at the four corners probably because the four corners are most relaxing areas for hens. Then, hens lay eggs mostly at the four corners if the cage has a space large enough for being kept in a sanitary condition. As a result of such concentration of laid eggs, the risk of exposing hatching eggs to harmful bacteria increases and many laid eggs collide with each other to damage themselves. Concentration of laid eggs is successfully avoided and hens lay eggs in a distributed manner when intermediate partitions are provided to produce an atmosphere similar to the atmosphere of the four corners around the intermediate partitions. Then, as a result, the floor is entirely effectively utilized and hens lay hatching eggs in a distributed manner in relaxation. Thus, the risk of contaminating hatching eggs with harmful bacteria and damaging them is reduced to raise the quantity of collected good hatching eggs. The obtained hatching eggs show an improved hatching ratio and excellent chicks are produced from them.

The invention also provides the following advantages.

It has been found that, when intermediate partitions are installed in a cage to produce additional four corners that are same as the original four corners of the cage, hens like all the four corners including the original four corners and the additional four corners for laying eggs. Then, the end partitions at the opposite ends of the cage that produce the original four corners and the intermediate partitions are differentiated in terms of shape. More specifically, the intermediate partitions are made to show a visually large blockading area so as to produce more shadowed area than the partitions at the opposite ends. Then, the concentration to the original four corners is reduced further and the advantages described above for the invention defined by claim 1 can be achieved more clearly and definitely.

The invention further provides the following advantages.

Each intermediate partition is provided with a window for freely viewing the inside of the cage at a position above the plate that has visually blockading surfaces for producing shaded areas. Then, as a result, each hen can freely view the entire cage simply by changing her attitude regardless of the existence of the plates having visually blockading surfaces of the intermediate partitions. Similarly, each cock can freely view the entire cage and then is encouraged to move more actively and voluntarily to dissolve the problem of concentration.

BEST MODE FOR CARRYING OUT THE INVENTION

Figure 1:
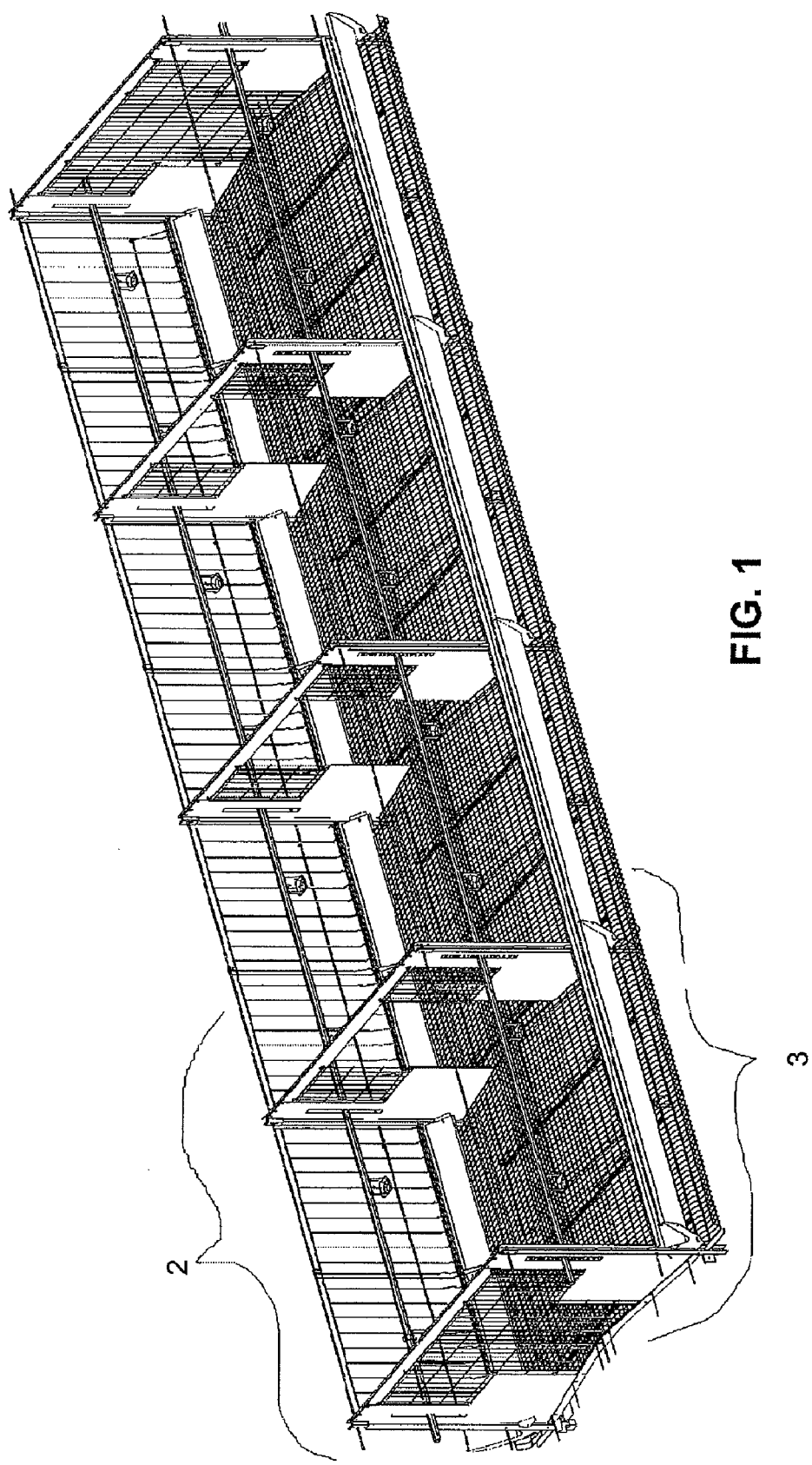
FIG. 1 is a schematic perspective view of an embodiment of a cage for breeding hens and cocks according to the present invention.
Figure 2:
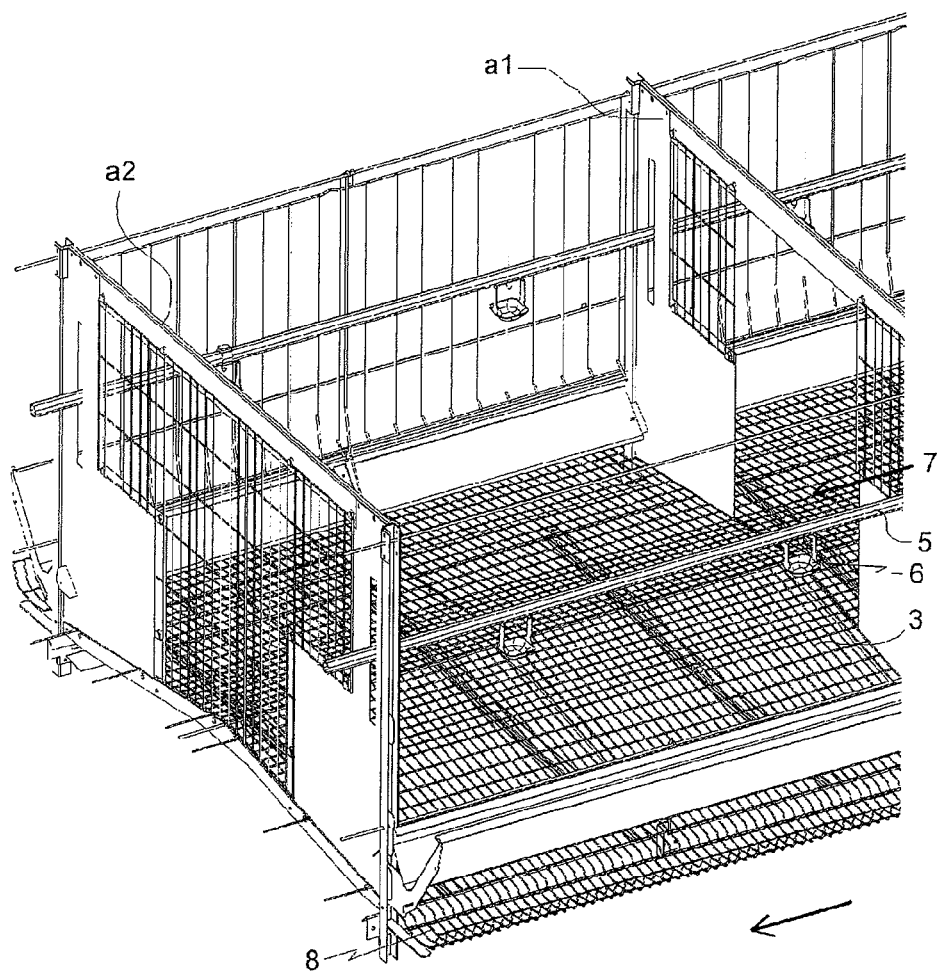
FIG. 2 is an enlarged schematic perspective view of the part indicated by reference symbol 2 in FIG. 1.
Figure 3:
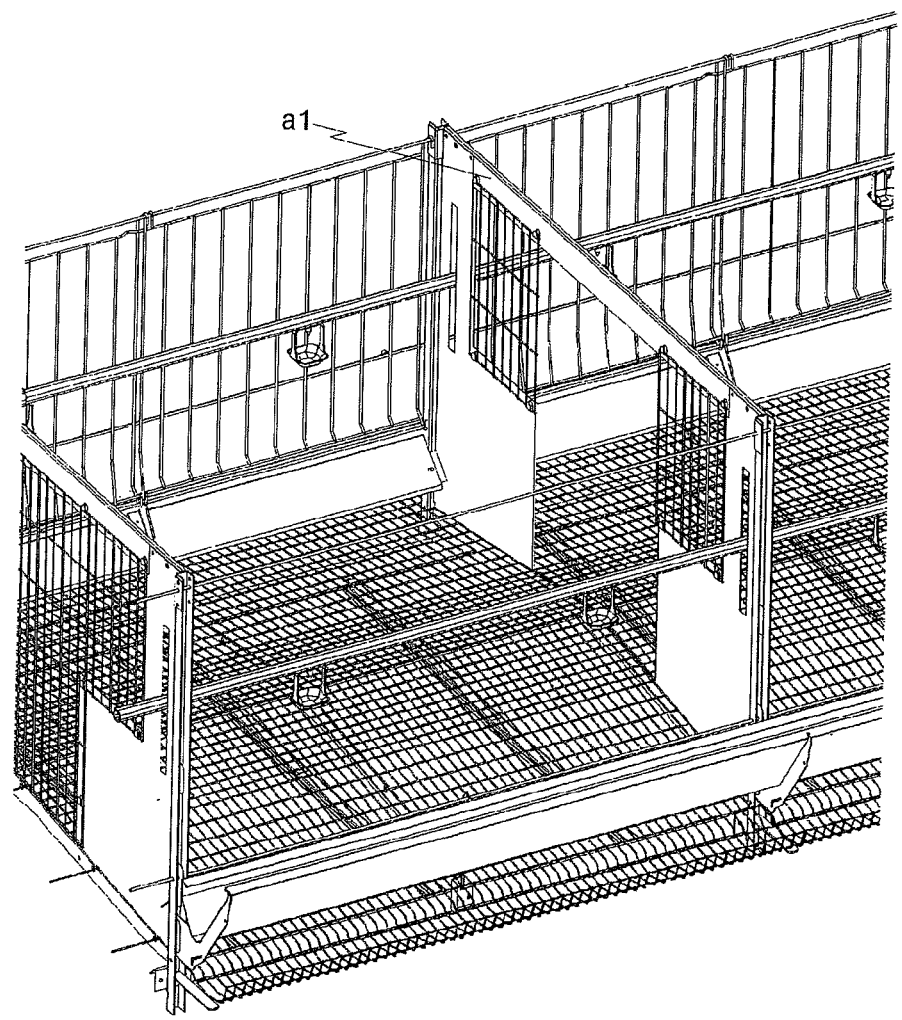
FIG. 3 is an enlarged schematic perspective view of the part indicated by reference symbol 3 in FIG. 1.
Figure 4:
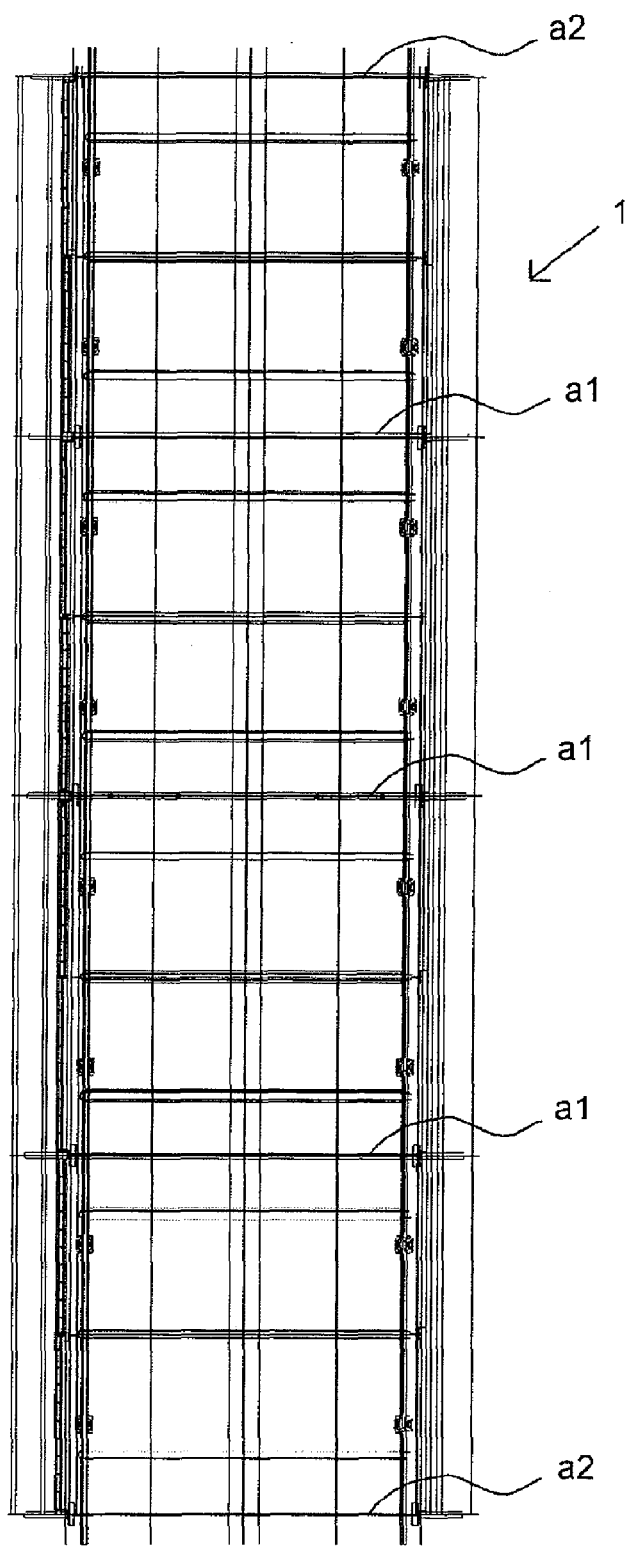
FIG. 4 is a top view of the cage of FIG. 1.
Figure 5:
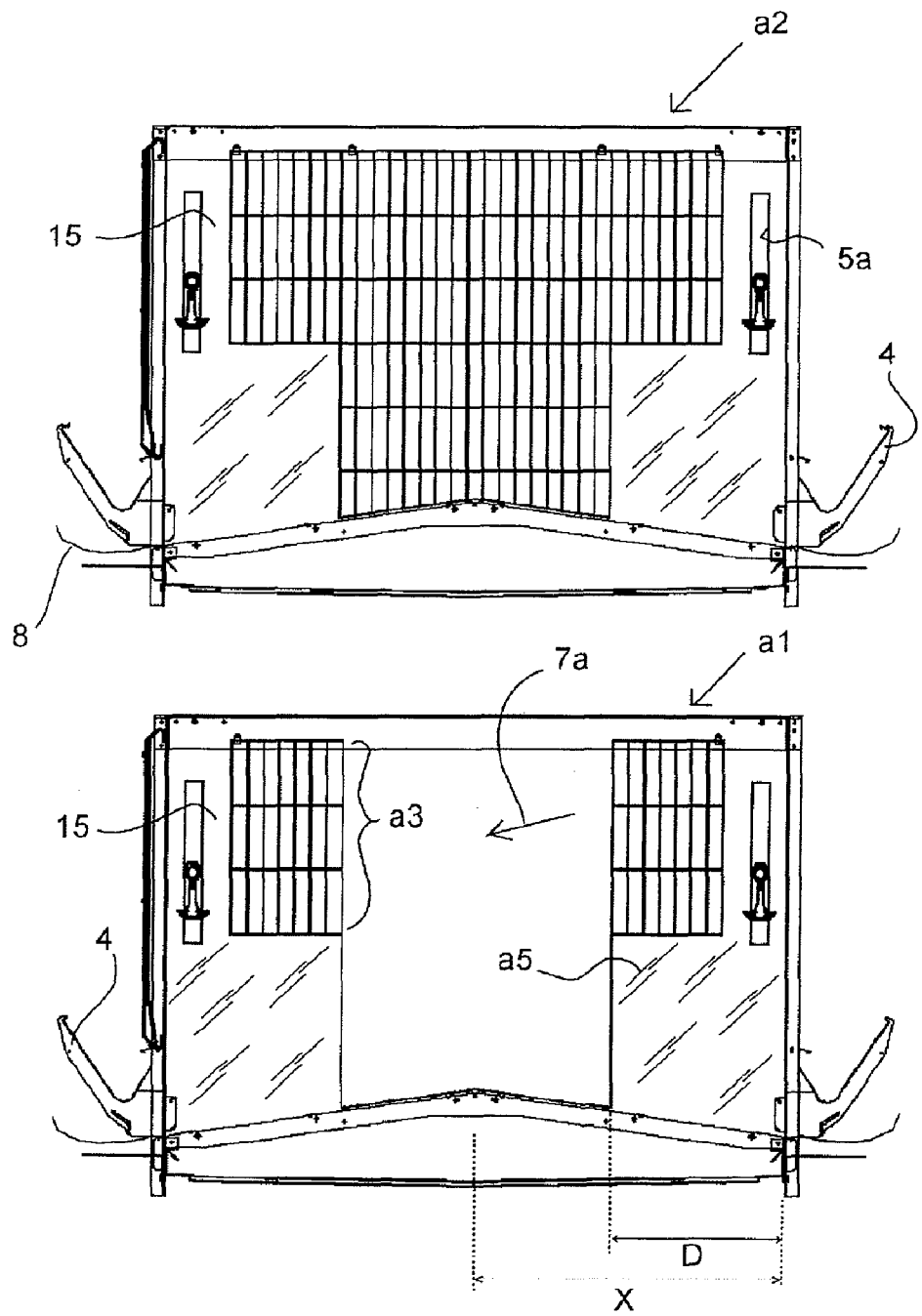
FIG. 5 is a lateral view of an intermediate partition for dividing the inside of the cage and that of an end partition for defining an end of the cage as viewed in the longitudinal direction of the cage.

Now, embodiments of the present invention will be described below by referring to the accompanying drawings. FIG. 1 is a schematic perspective view of the first embodiment of cage for breeding hens and cocks according to the present invention. Note that FIG. 1 only shows one of the tiers of cages installed in a poultry farm. FIG. 2 is an enlarged schematic perspective view of the part indicted by reference symbol 2 in FIG. 1. FIG. 3 is an enlarged schematic perspective view of the part indicated by reference symbol 3 in FIG. 1. FIG. 4 is a top view of the cage of FIG. 1. FIG. 5 is a schematic illustration of an intermediate partition arranged at an intermediate position in the cage and an end partition that defines an end of the cage as viewed in a longitudinal direction. The first embodiment will be described below by referring to FIGS. 1 through 5.

As seen from the top view of FIG. 4, the cage has an oblong contour as viewed from above with a ratio of each short side to each long side of about 1 to 4. The opposite ends in the longitudinal direction of the cage are closed by respective end partitions a2 and the inside of the cage that is defined by the end partitions a2 is divided by intermediate partitions a1 in such a way that hens and cocks can walk through them. The cage is substantially entirely surrounded by a metal network or a metal latticework. Therefore, while air can freely path through the metal network or the metal latticework, the arrangement may not necessarily relax hens and cocks.

The floor of the cage for breeding hens and cocks is raised along the longitudinal center line and. The floor is formed as a latticework 3 that does not discourage hens and cocks to walk thereon and allows feces to easily fall through it. The latticework 3 of the floor is sloped down from the longitudinal center line toward the longitudinal edges. The longitudinal edges are mildly linked to respective egg collecting trays 8.

On the other hand, a water feed pipe 5 is suspended above a feed trough 4 along each longitudinal edge of the cage. The water feed pipes 5 are provided with water receptacles 6 arranged at intervals. The water receptacles 6 are arranged at such a height that they do not obstruct movements of hens and cocks and allow them to drink water only by stretching the neck. While the height of the water receptacles 6 needs to be adjusted so as to satisfy the above requirements for both hens and cocks, it should be such that the water receptacles 6 do not obstruct at least movements of hens and allow them to drink water only by stretching the neck because hens take an overwhelming majority in the cage. Hens and cocks move through the spaces 7, or the center pathways 7a defined by the lateral shadow forming sections.

The shadow forming sections are visually blockading surfaces for the hens and the cocks who are fed in the cage.

In this embodiment, three intermediate partitions a1 are arranged in the cage that is formed to satisfy the above requirements as seen from FIG. 4. The profile of the intermediate partitions a1 is designed with special considerations. The lower partition illustrated in the lower half of FIG. 5 is an intermediate partition a1 that is provided at lateral sides thereof with respective shadow forming sections a5. Preferably, the width D of each shadow forming section a5 is greater than a half of the distance from the center line to each lateral edge of the partition. The height of the shadow forming sections a5 is determined by taking the average height of hens into consideration.

A network window a3 is arranged on each shadow forming section a5 having the above-described profile.

This is because if the upper edge of each shadow forming section a5 provides a free space, hens can climb up to there.

The longitudinal opposite ends of the cage of the first embodiment are closed by end partitions a2 having a profile as illustrated in the upper half of FIG. 5. The end partitions a2 are provided with shadow forming sections a5, which are same as those of the intermediate partitions a1 in terms of profile, for the purpose of raising the effect of egg production. However, part of each of the end partitions a1 that corresponds to the central pathway 7a of each of the intermediate partitions a1 is closed by a network similar to the networks of the network windows a3 of the intermediate partitions a1.

Breeding hens and cocks selected for producing hatching eggs are fed in the cage of the first embodiment at a ratio of 10 to 1 for the number of hens relative to that of cocks. While hens lays eggs only at the four corners of a conventional cage, hens lays eggs at the opposite sides of the shadow forming sections a5 as well as at the original four corners of the cage of this embodiment because hens are relaxed at the corners of a cage. Meanwhile, cocks are higher than hens and their heads can get to the network windows a3 to obtain visual information on the inside of the cage through the network windows a3. Therefore, they stay at a position less probably than ever. In other words, the network windows encourage cocks to move to somewhere else in the cage so as to become scattered as a whole. In other words, cocks freely move in the cage to raise the mating rate.

Thus, while hens lay eggs mostly at the four corners of a cage of the prior art, they are scattered in a cage according to the present invention to eliminate any extreme concentration. Therefore, both the probability at which laid eggs are contaminated by harmful bacteria and the probability at which eggs collide with each other to damage themselves are lowered.

While the height of the boundary of each network window a3 and the corresponding shadow forming sections a5 is described above, it is most preferably such that, while cocks can look around with ease, hens car hardly do so. By selecting such a height, hens can lay eggs in a calm mood while cocks are encouraged to move to somewhere else in the cage.

All the shadow forming sections a5 of the above-described first embodiment provide the same conditions. Therefore, all the shadow forming sections a5 are equally expected to gather hens to huddle together. While the concentration of hens at the four corners of a cage of the prior art is alleviated to some extent in this embodiment, hens tend to gather and huddle together at the four corners to some extent. In other words, while the concentration of hens at and near the shadow forming sections a5 of the end partitions a2 is alleviated, those areas are still found to be places where hens likely to gather most.

Figure 6:
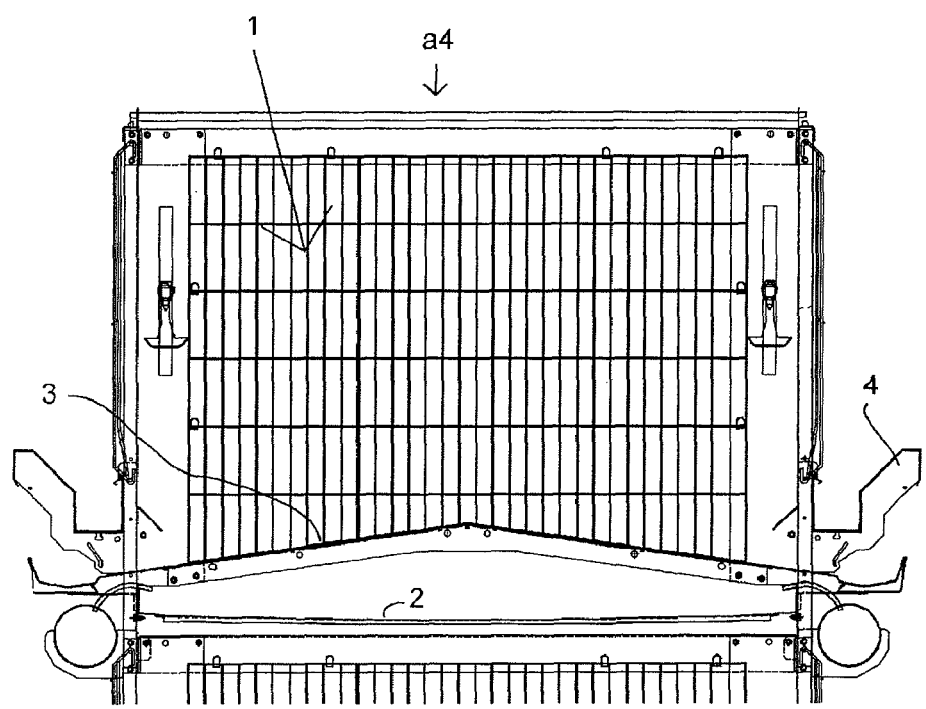
FIG. 6 is an enlarged schematic view of an end partition of another embodiment of the present invention.

In the second embodiment of the present invention, the shadow forming sections a5 of the end partitions a2 are eliminated. FIG. 6 shows an end partition a4 having no shadow forming sections a5. The shadow forming sections a5 of the end partitions a2 are replaced by so many networks K1. With this arrangement, hens who habitually gather at the four corners tend to move toward the intermediate partitions a1 having shadow forming sections a5 to some extent because the end partitions do not provide any shadow that relaxes hens. Then, as a result, hens gather at all the corners in a well balanced manner.

Note that the structural parts 15 shown in FIG. 5 are common to all the intermediate partitions a1, the end partitions a2 and the end partitions 4 and serve as so many parts of the longitudinal supports of the partitions. The structural parts 15 stand vertically along the lateral sides of the cage and have a width that does not obstruct the views of hens and cocks. In other words, they serve as parts of the vertical pillars of the age.

Thus, the network windows a3 that allow cocks to have a wide view provide satisfactory spaces near the central pathways 7a of the intermediate partitions a1 for cocks who look around. Thus, cocks can have a satisfactory field of vision regardless of the structural parts 15.

While the intermediate partitions a1 of the above-described embodiments have a symmetrical profile as viewed in the longitudinal direction of the cage, the number of intermediate partitions a1 may be doubled, for example, and each of the intermediate partitions a1 is provided with a single shadow forming section a5 arranged at either of the lateral sides thereof so that the shadow forming sections a5 of the intermediate partitions a1 may be arranged in an alternating manner. With such an arrangement, the central pathway 7a of each of the intermediate partitions a1 can be broadened to provide an effect of scattering hens and accordingly an incidental effect of improving the sanitation of hatching eggs, increasing the number of hatching eggs and also improving the quality of hatching eggs.

While the partition walls are provided with shadow forming sections in the cage of each of the above-described embodiments, they may be replaced by inverted V-shaped screens that are arranged at desired positions in the cage to produce shadows in a simple manner. The advantages of such an arrangement may be similar to the above-described ones of the present invention when the size and the profile of such screens are appropriately designed.

A blinder plate (not shown) may be attached to the lower end of each of the network windows a3 of the first embodiment by means of bolts to form a sandwich structure so that it may be moved up or down for positional adjustment. Then, the blinders may be adjusted for their positions so as to be raised (or lowered) when large (or small, whichever appropriate) hens are housed in the cage.

EXPLANATION OF REFERENCE SYMBOLS a1: intermediate partition
a2: end partition
a3: network window
a4: end partition
a5: shadow forming section
1: cage
2: belt conveyor
3: latticework bed
4: feed trough
5: water feed pipe
5a: passage slot for water feed pipe 5
6: water receptacle
8: egg collection tray
9: poultry feces drying air feed pipe.
11: air feed branch pipe.

The invention claimed is:

1. A cage for containing a number of breeding hens and cocks and collecting hatching eggs laid by natural mating, said cage comprising:
   an oblong and continuous floor having a longitudinal direction and made of a material suitable for allowing air to pass freely through the floor and for allowing hens and cocks being fed in the cage to freely move in all directions along the floor;
   an outer peripheral section serving as outer peripheral walls surrounding the floor and also made of material suitable for allowing air to pass freely therethrough the outer peripheral walls including two end partitions arranged to close longitudinal opposite ends of the floor to the passage of the hens and cocks; and
   a plurality of intermediate partitions arranged transversally relative to the longitudinal direction of the floor and having visually blockading surfaces, each of the intermediate partitions having a central pathway defined laterally between sections of the visually blockading surfaces for allowing hens and cocks in the cage to freely move through each central pathway, and each section of the visually blockading surfaces
   a) having a network window at upper portion thereof, and
   b) having a width that is greater than half of a distance from a longitudinal center line of the floor to an adjacent outer edge of the floor.

2. The cage according to claim 1, wherein each of the end partitions comprises:
   end sections of end visually blockading surfaces which are the same as the sections of the intermediate partitions in terms of profile and between which end sections an end central pathway is defined,
   an end network window provided on an upper portion of each end section, and
   an end network which closes the end central pathway of each end partition.

3. The cage according to claim 1, wherein a boundary height of each section of the visually blockading surfaces and the network window associated therewith is set so that cocks of a predetermined height are able to look through each network window with ease but the hens can not do so.

4. The cage according to claim 2, wherein a boundary height of each section of the visually blockading surfaces and the network window associated therewith is set so that cocks of a predetermined height are able to look through each network window with ease but the hens can not do so.

* * * * *